(12) United States Patent
Generozova et al.

(10) Patent No.: US 9,808,078 B2
(45) Date of Patent: Nov. 7, 2017

(54) POLICY CONFIGURATION MANAGEMENT CONSOLE

(71) Applicant: Citrix Systems, Inc., Fort Lauderdale, FL (US)

(72) Inventors: Olga Generozova, London (GB); Sarah Aquino, Union City, CA (US); Dai Tang, Mountain View, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 278 days.

(21) Appl. No.: 14/702,842

(22) Filed: May 4, 2015

(65) Prior Publication Data

US 2015/0319039 A1 Nov. 5, 2015

Related U.S. Application Data

(60) Provisional application No. 61/988,635, filed on May 5, 2014.

(51) Int. Cl.
*A46B 17/02* (2006.01)
*G06F 9/445* (2006.01)
*F16M 13/02* (2006.01)
*F16B 1/00* (2006.01)

(52) U.S. Cl.
CPC ........... *A46B 17/02* (2013.01); *F16M 13/022* (2013.01); *G06F 9/44505* (2013.01); *F16B 2001/0035* (2013.01)

(58) Field of Classification Search
CPC .. A46B 17/02; F16M 13/022; G06F 9/44505; F16B 2001/0035
See application file for complete search history.

(56) References Cited

U.S. PATENT DOCUMENTS

| | | | |
|---|---|---|---|
| 2004/0260495 A1* | 12/2004 | Hopple | G06F 17/30 702/83 |
| 2008/0133572 A1* | 6/2008 | Verhey-Henke | G06F 19/363 |
| 2009/0228868 A1 | 9/2009 | Drukman et al. | |
| 2009/0237724 A1* | 9/2009 | Furuya | G06F 3/1205 358/1.15 |

OTHER PUBLICATIONS

Jul. 17, 2015—International Search Report—Int'l App No. PCT/US15/29056.

* cited by examiner

*Primary Examiner* — John B Walsh
(74) *Attorney, Agent, or Firm* — Banner & Witcoff, Ltd.

(57) ABSTRACT

Methods and systems for managing policy configurations of different device types are described herein. An interface may be provided to a user where individual settings of different device types that are similar or the same are mapped to the same setting on the interface. The valid options or values for the individual device types are evaluated to identify common options or values. The user may select the common options or values of each common setting. The values selected as common settings values may be saved as the values for the corresponding individual settings of the different device types.

20 Claims, 10 Drawing Sheets

FIG. 5

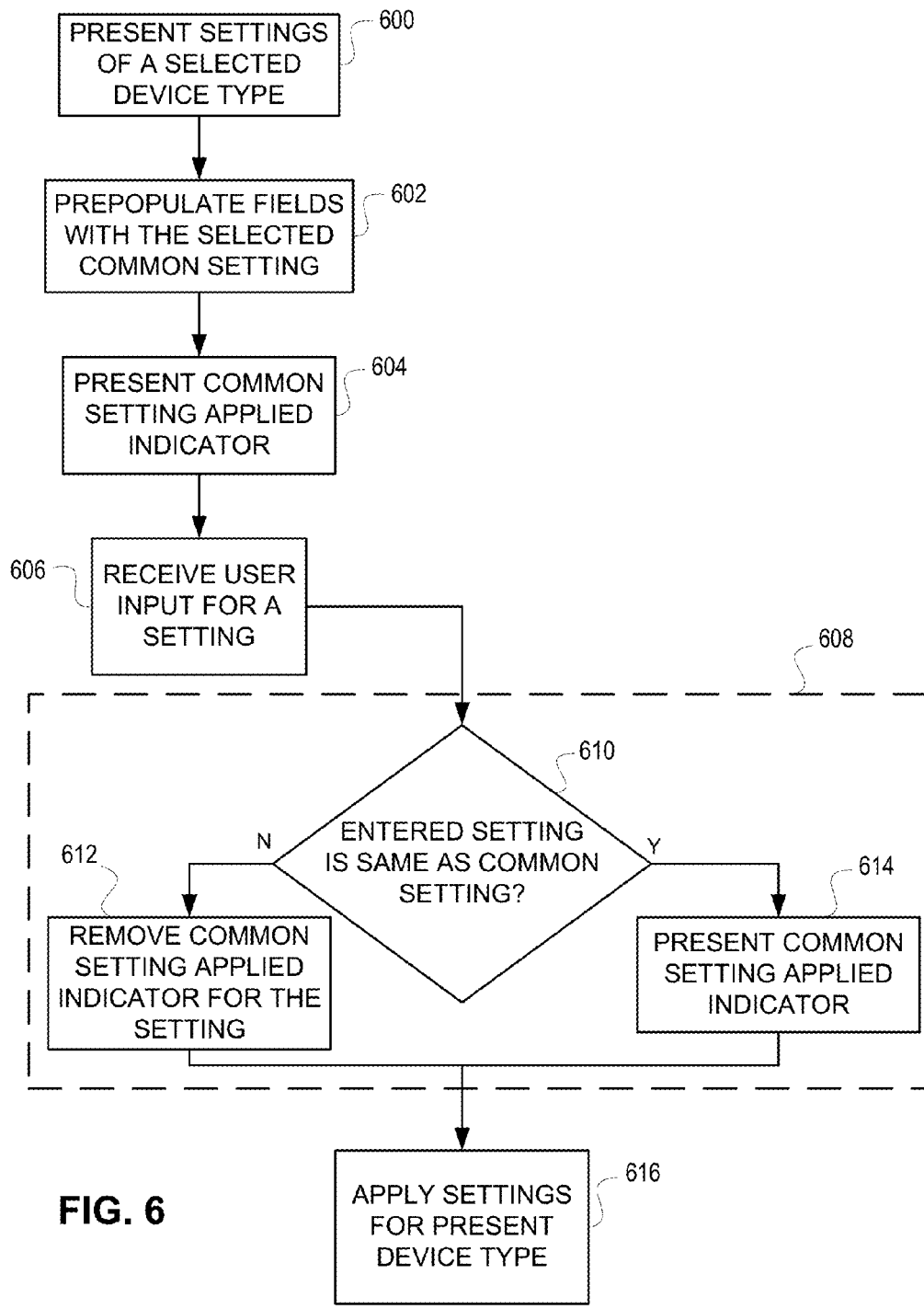

PASSWORD POLICY: DEVICE TYPE 1

Password required: ON

Minimum length: 4

Required characters: No restriction

Minimum number of symbols: 4

Device lock grace period: Immediately

Lock device after: 5 minutes of inactivity

Password expiration: 90 days (1-730)

Previous passwords saved: 0 (0-50)

Maximum failed sign on attempts: 8

Password Policy
1. Device Types
   ☒ Device Type 1
   ☒ Device Type 2
   ☐ Device Type 3
   ☒ Device Type 4
   ☐ Device Type 5
   ☐ Device Type 6

[PREVIEW COMMON SETTINGS]
[COPY COMMON SETTINGS ACROSS SELECTED DEVICE TYPES]

FIG. 7

| Settings | Device Type 1 | Device Type 2 | Device Type 4 |
| --- | --- | --- | --- |
| Passcode required | Y | Y | Y |
| Minimum length | Minimum length codes. Optional. Blank or 1-14. | Minimum length codes. Optional. Blank or 4-16. | Minimum password length. Optional. 4-18. |
| Required characters | Require alphanumeric values'. Optional. | Any, Numeric only, Aphanumeric, Alphabetic; Biometric recognition, Set advanced rules. Any characters. | Password complexity. Alphanumeric; Alphanumeric or Numeric; Alphanumeric, Numeric or None. Optional. |
| Allow simple passcodes | Allow simple values. | N | Allow simple password |
| Biometric recongnition | N | Y | N |
| Lock device after / minutes of inactivity | Auto lock. Optional. None or 1,2,3,4,5,10,15 | Maximum time to lock (in minutes). Required. No value restrictions. | Inactivity before device lock (in minutes). Required. 0-999. |
| Passcode expiry / days | Maximum passcode age. Required. 1-730 days or None. | Maximal duration of the password (in days). Required. No value restrictions. | Password Expiration (in days). Required. 0-730 days. |
| Previous passwords saved *Tooltip: Prevents users from reusing previous passwords.* | Passcode History. Required. 1-50 or None. | Password history. Required. No value restrictions specified. | Password History. Required. 0-50. |
| Maximum failed sign on attempts *Tooltip: If the number of failed logon attempts is exceeded, the device is wiped.* | Maximum failed attempts. Optional. Blank or 2-10. | Maximum failed attempts before wiping the device. Optional. Blank or 4-17. | Maximum password attempts before wipe. Required. 0-999. |
| Device lock grace period | Immediately, 1 minute, 5 minutes, 15 minutes, 1 hour, 4 hours. | N | N |
| Minimum number of symbols | Minimum number of complex characters. Optional. Blank or 1-4. | Minimum number of symbols required in the password. Optional. 0-10. | Minimum Password Complex Characters. Required. 1-4. |

FIG. 10

POLICY CONFIGURATION MANAGEMENT CONSOLE

CROSS REFERENCE TO RELATED APPLICATIONS

This application claims priority to provisional U.S. Application No. 61/988,635, entitled "Policy Configuration Management Console," filed May 5, 2014, the contents of which are herein incorporated by reference in its entirety for all purposes.

FIELD

Aspects described herein relate generally to configuring computing devices. More specifically, aspects described herein relate to managing policies and configuring policies and settings for different device types.

BACKGROUND

Different computing devices (e.g., different mobile phones or mobile operating systems) may offer different settings that can be configured by a user or administrator. In addition, these different devices and/or operating systems may each use different terminology to refer to a setting that performs the same function on each device. That is, across different devices the same setting may be named differently and/or there may be different options which are valid for each setting and different default values. The same settings may be presented using different interface elements for different platforms. It is difficult and tedious for an administrator to configure devices having such differing settings.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards methods and systems for managing policy configurations of different device types. An interface may be provided to a user where individual settings of different device types that are similar or the same are mapped to the same setting on the interface. The valid options or values for the individual device types are evaluated to identify common options or values. The user may select the common options or values of each common setting. The values selected as common settings values may be saved as the values for the corresponding individual settings of the different device types.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 5 depicts an illustrative device type configuration interface that may be used in accordance with one or more illustrative aspects described herein.

FIG. 6 depicts a flowchart of an illustrative method of configuring device type settings in accordance with one or more illustrative aspects described herein.

FIG. 7 depicts an illustrative common settings and device type settings configuration interface in accordance with one or more illustrative aspects described herein.

FIG. 10 depicts illustrative device type information in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Aspects of the disclosure described herein relate to enabling managing of or configuring settings on different devices using a selection that can be applied to more than one device type. The system may identify settings which are labeled or named differently on different devices but relate to the same underlying concept and map those settings to a single common setting. Because different devices may have different options or values which are valid for each setting, the system can also determine common valid options for each setting and restrict or otherwise indicate the available options for each setting to the common valid options.

Computing Architecture

Figure 1:
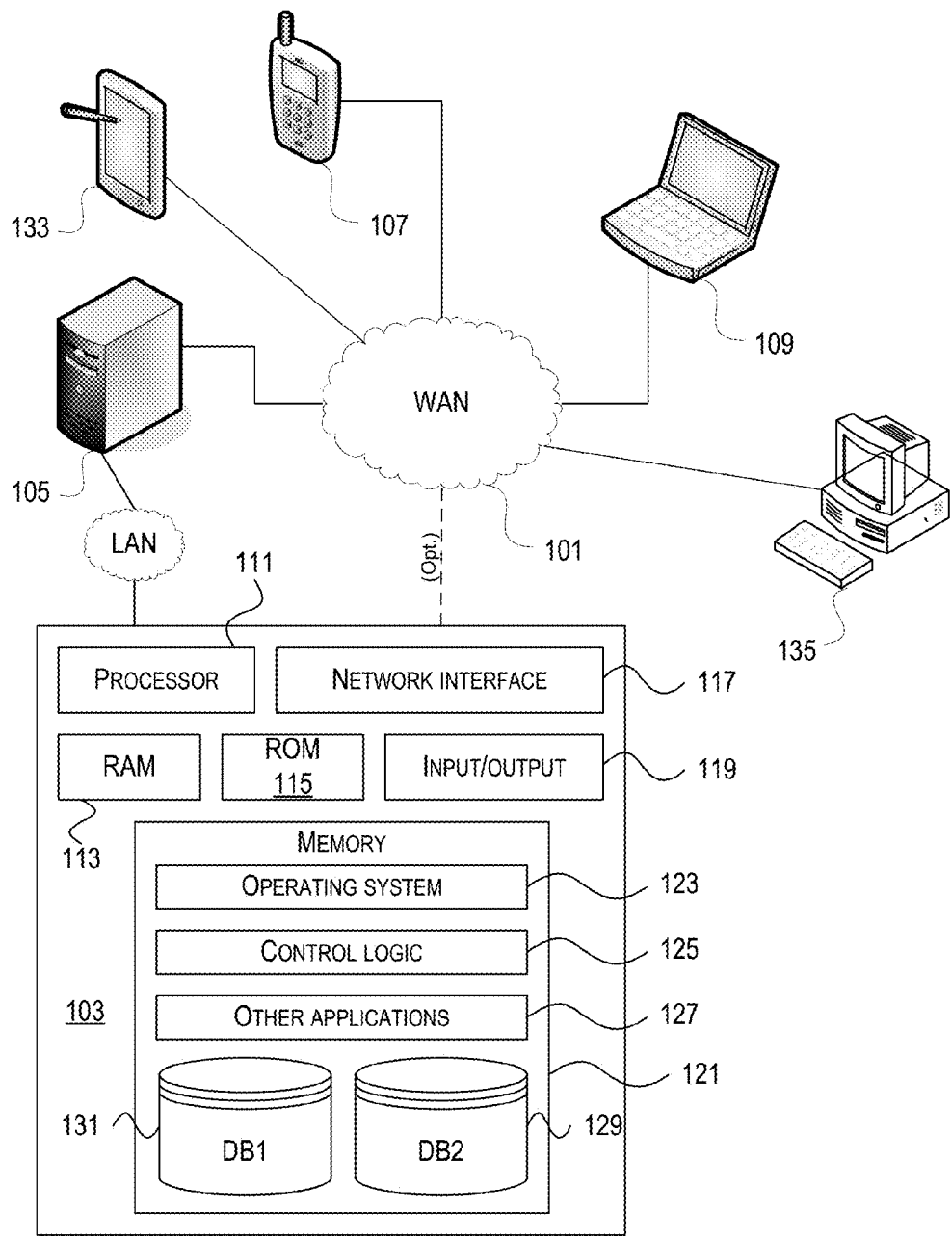
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, 109, 133, and 135 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109, 133, and 135 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109, 133, 135. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, 133, 135, e.g., using a web browser to connect to the data server 103 via one or more externally exposed web sites hosted by web server 105. Client computers 107, 109, 133, 135 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109, 133, 135 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109, 133, 135 may have similar or different architecture as described with respect to device 103. Those of skill in the art will appreciate that the functionality of data processing device 103 (or device 105, 107, 109, 133, 135) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Components 105, 107, 109, 133, 135 may be personal computers, mobile devices, laptop computers, tablets, or servers that include many or all of the elements described above with respect to the computing device 103. The network connections depicted in FIG. 1 include a local area network (LAN) and a wide area network (WAN), but may also include other networks. The components 105 may be connected to the LAN through a network interface or adapter. When used in a WAN networking environment, components 105, 107, 109, 133, 135 may include a modem or other wide area network interface for establishing communications over the WAN, such as computer network (e.g., the Internet). It will be appreciated that the network connections shown are illustrative and other means of establishing a communications link between the computers may be used. Components 107, 109, 133 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

Configuring Common Settings and Device Type Settings

Figure 2:
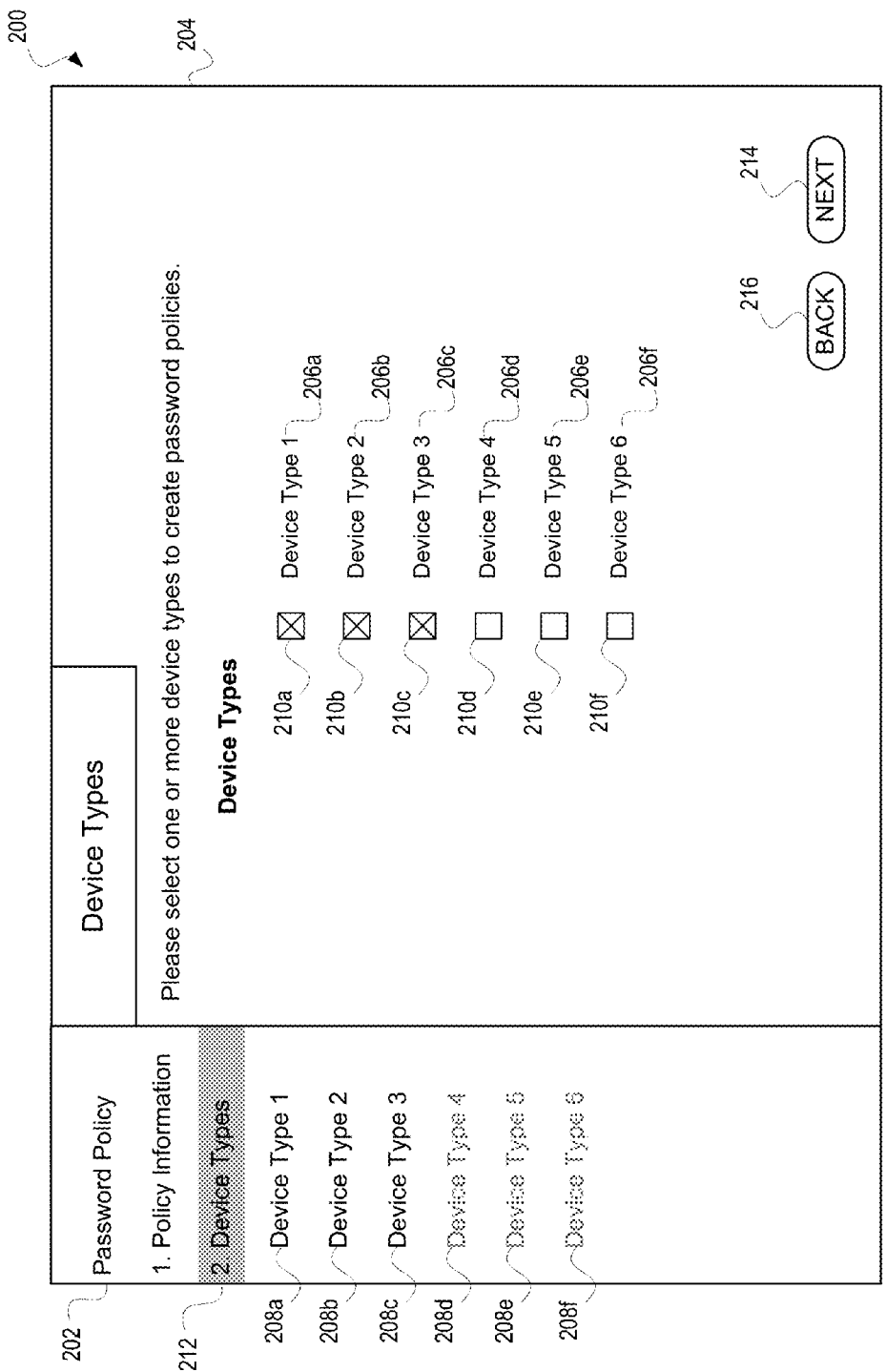
FIG. 2 depicts an illustrative selection interface that may be used in accordance with one or more illustrative aspects described herein.
Figure 3:
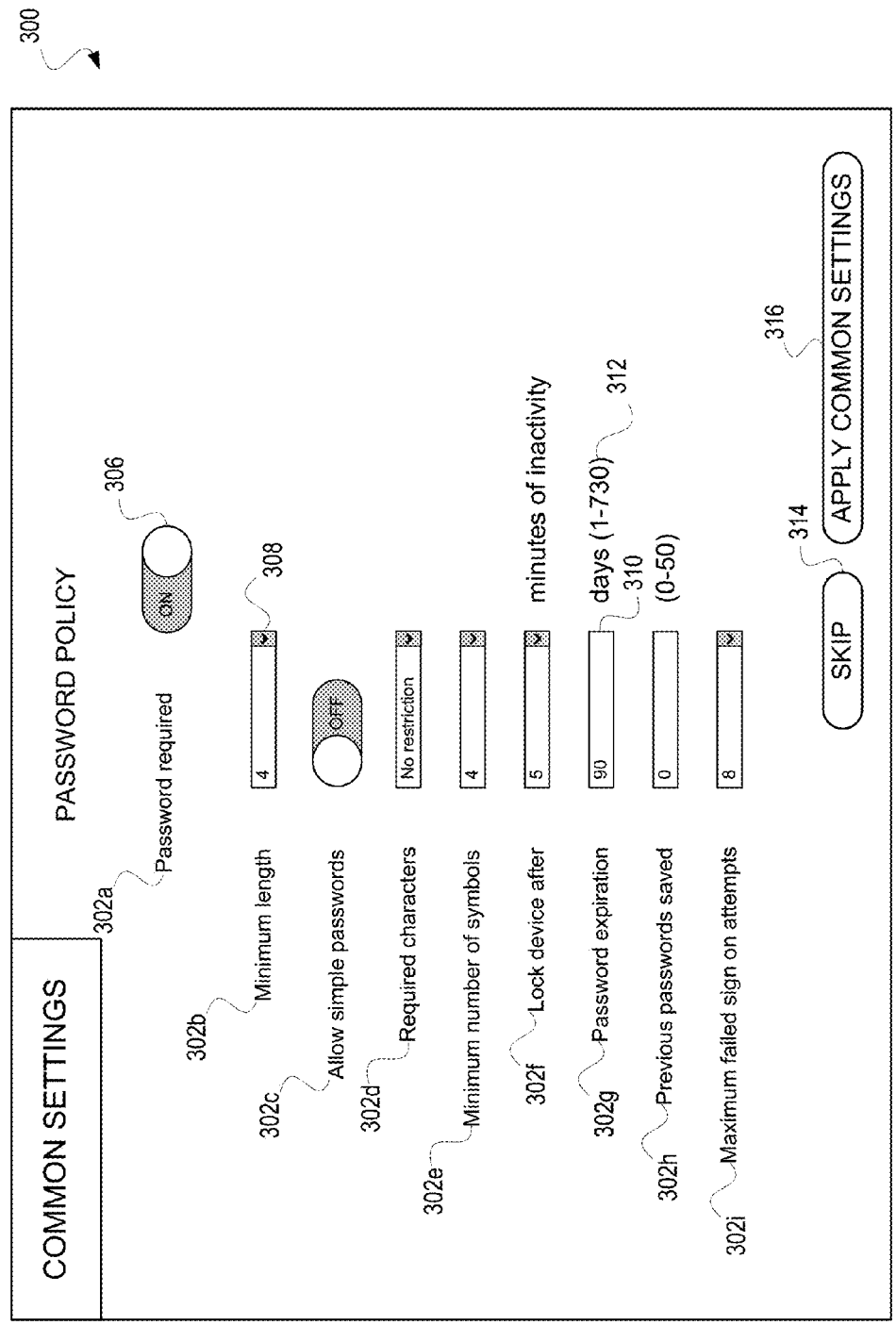
FIG. 3 depicts an illustrative common settings configuration interface that may be used in accordance with one or more illustrative aspects described herein.

FIGS. 2 and 3 depict illustrative aspects of enabling management and configuration of settings across different devices or device types which are common or similar to more than one device or device type. For example, computing device 105 may manage settings across one or more of computing devices 107, 109, 133, 135 by enabling a user interacting with computing device 105 to select the settings for multiple computing devices. A group of settings may be categorized as a policy. The policy may be defined by multiple individual settings for one or more device types. A device type may be a characteristic or feature common to a group of devices or a characteristic representing a group of devices. The device type may be, for example, a general device category (e.g., laptop, desktop computer, tablet, mobile phone, smartphone, feature phone, personal digital assistant (PDA), gaming system, or any other hardware device category) or device operating system or platform (e.g., iOS, Android, Windows, Linux, Unix, Mac OS, Chrome OS, Samsung Knox, Samsung SAFE, etc.). The device types being configured may correspond to the device types of computing devices 107, 109, 133, 135. The computing device 105 may communicate with data server 103 for data and mappings between individual device settings and common settings.

In the examples shown in FIGS. 2 and 3, a password policy may be established for different device types. The policy name may be a name chosen by the user, and the user may provide a brief description in a field (not shown) of the policy to enable easy and quick identification of the purpose and contents of the policy.

FIG. 2 shows an illustrative user interface 202 where a user can select device types 206*a*-206*f* for which the user would like to provide specific settings with respect to the policy, for example, the password policy. The user interface 200 may include a navigation menu 202 and a user input area 204. Navigation menu 202 provides an overview of the stages or interfaces in the policy configuration process. A user may select items in navigation menu 202 to jump between different interfaces displayed in user input area 204 or stages in the process of configuring settings for the policy.

A user may use, for example, a cursor to select the device types the user would like to include in the policy setting. The selected device types may be indicated using a corresponding selection indicator 210 such as a check box. Once a device type is selected, the device type name 208 in navigation menu 202 may be bolded or otherwise differentiated (e.g., highlighted) to indicate that the device type has been selected and a configuration interface for the particular device type has been enabled. For example, device types 1-3 have been selected as indicated by boxes 210*a*-*c*. The corresponding device type names 208*a*-*c* in navigation menu 202 may be differentiated from the unselected device types using a font style (e.g., bold, italics, underline) or other indicator (e.g. highlighting, shading) and become enabled (e.g., clickable or selectable) while other device type names 208*d*-*f* remain disabled (e.g., unclickable or unselectable). A navigation indicator 212 may be presented to indicate the current stage in the process. Navigation indicator 212 may be in the form of a shading or highlighting of the text of the current stage. In the example of FIG. 2, progress indicator 212 is provided for "2. Device Types" to indicate that the user is at the device types selection interface. After the user has finished selecting the device types to configure, the user may choose the NEXT button 214 to proceed to the next screen, in this case, the configuration screen for Device Type 1. The user may select the BACK button 216 to return to the policy information screen.

According to another aspect, the device types may further be listed in order of usage or popularity on the device type selection interface 204. For example, the system may have knowledge of the number of deployed devices falling under each device type or the level of usage of each device type. The device type having the highest usage or the largest number of deployed devices may be listed first with subsequent device types being listed in order of decreasing popularity or usage. In another aspect, a number of the most popular or highest usage device types may be selected by default if the usage level or number of devices is above a threshold. For example, if the percentage of deployed devices that are Device Type 1 is above a certain percentage threshold, Device Type 1 may be selected by default. In yet another aspect, there may be many device types available, and a user might not manage all device types or might not deploy devices of all device types. In this aspect, the system may select by default only those devices which are used or deployed by the user.

As mentioned above, once a device type is selected, the configuration screen for the selected device types may be enabled or added to the policy configuration process. Because more than one device type may have individual settings which are the same or similar to an individual setting of another device type, a common settings user interface 300 may be provided where a user can select or enter options for settings which are common across more than one selected device type. The common settings user interface 300 enables the user to select or enter options once for a particular setting and have the chosen option propagated or saved for all of the device types rather than entering the setting separately at the configuration screen for each individual device type. The information provided through the common settings user interface 300 is mapped to each device type selected by the user, based on a mapping of the information provided in user interface 300 to the different particular variables used by each device type that correspond to the same principle.

FIG. 3 shows an example of a common settings interface 300. Before showing the configuration screen for Device Type 1, common settings user interface 300 may be presented to the user to enable the user to select options or enter values for each setting which is common to more than one device type. As will be described in more detail with respect to FIG. 4, the system or computing device can determine which settings are common to more than one device type based on the selected device types and provide the common settings and options or values in the common settings user interface 300. Continuing in the password policy example as illustrated in FIG. 2, common settings interface 300 presents individual settings 302 which may be common to two or more of the selected device types 1-3. For example, device types 1-3 may each have a configuration setting for whether a password is required 302a, a minimum length of a password 302b, allowing simple passwords 302c, requiring use of specific characters 302d, a minimum number of symbols in the password 302e, locking the device after a selected period of inactivity 302f, a password expiration time period 302g, previously saved passwords 302h, and a maximum number of failed sign on attempts allowed 302i. Each of these configuration settings 302 may be provided with an input field, for example, in the form of a toggle switch 306, a dropdown menu 308, or entry field 310. An entry field 310 may be presented with information regarding the limits or range of the allowed inputs or values 312. The limits of the inputs for the toggle switch 306 and the dropdown menu 308 are integrated into these input options. For example, the dropdown menu 308 may only be populated with values which are valid for the selected platforms containing these settings. The device settings may be prepopulated values. The prepopulated values may be default values. The default values of the same setting for different device types may be different. Additionally, some device types may have default values while other device types might not have default values. In this instance, a common value may be selected, if possible. If it is not possible to select a common value, a default value might not be prepopulated. In some instances, a type of field might not be used for certain device types. If a specific field is used or required for at least one of the selected device types, the specific may be used in common settings. After the user has provided inputs or selections for the common settings, the user can select the APPLY COMMON SETTINGS button 316 to save the values provided in the common settings interface 300 for all of the appropriate device types.

The user also has the option of inputting all the settings individually for each device type by choosing to skip the common settings interface 300. This can be done by selecting the SKIP button 314.

Figure 4:
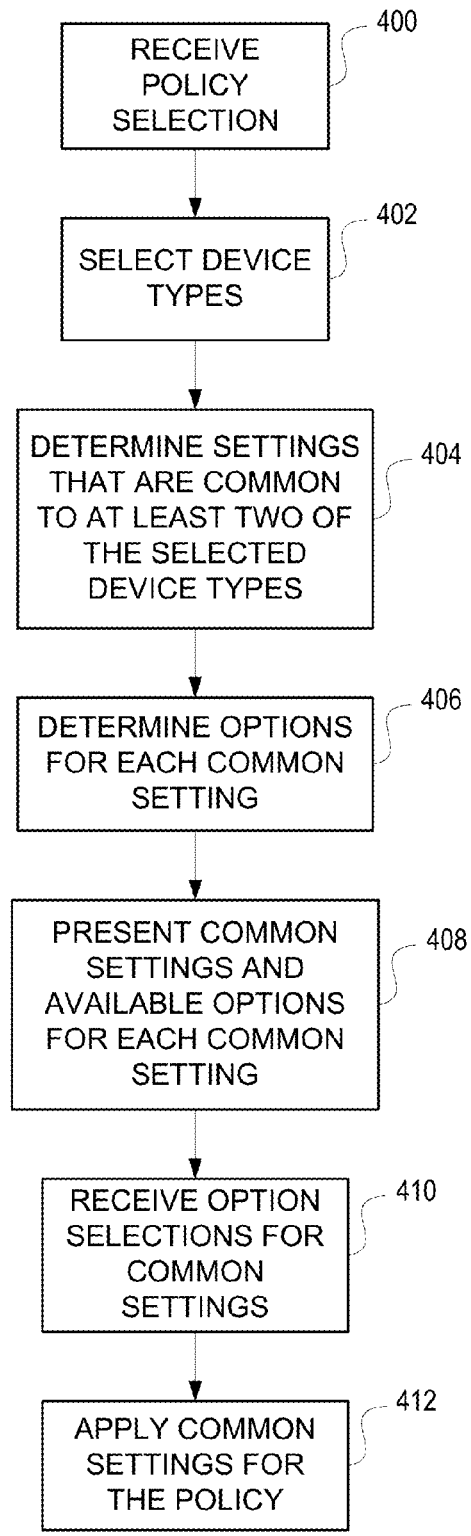
FIG. 4 depicts a flowchart of an illustrative method of configuring common settings in accordance with one or more illustrative aspects described herein.

FIG. 4 shows an illustrative method of receiving and applying common settings across multiple device types for a policy. At step 400, a computing device may receive a user input selecting a policy for configuration. Following the password policy example, the user may name the policy, for example, "password policy" and include a description of the password policy. The user may select the device types for which the password policy is to be applied, for example, via user interface 200. As discussed above, the computing device or system may be aware of the number of devices managed by the user or associated with the user and the device types of these devices. For example, the computing device may store this information or have access to a storage device containing this data such as data server 103. Using this knowledge, the computing device may prepopulate or select by default a number of the most popular device types or device types having the highest usage level. Popularity of the device may be measured by the percentage of managed devices for each device type. Usage level may be the aggregate amount of time each device of a particular device type has been used. The user may then select or confirm the device types to which the password policy that is being configured is to be applied.

At step 404, the computing device may determine which settings are present for more than one of the selected device type. The computing device may reference a database or data server 103 storing settings of different device types and their associations with a common settings concept. For example, for the feature of erasing all content from a device after a certain number of failed password entries, Device Type 1 may identify this feature as maximum failed attempts while Device Type 2 may identify this feature as maximum failed attempts before erasing device content. Device Type 3 might not include this feature. The database may store information indicating that the maximum failed attempts for Device Type 1 and that the maximum failed attempts for Device Type 2 are associated with the common setting concept of maximum failed attempts. Since Device Type 1 settings and Device Type 2 settings both include this concept, this feature is shown on the common settings page even though Device Type 3 settings might not include this concept.

At step 406, the computing device can determine the options or inputs which the device types have in common for each common settings/concept. For example, Device Type 1 and Device Type 2 may allow the user to select from different ranges of maximum failed attempts. Device Type 1 may allow between 2-10 maximum failed attempts before erasing device content, and Device Type 2 may allow between 4-17 maximum failed attempts before erasing device content. To set this feature in the common settings interface 300, the computing device may determine the options for maximum failed attempts that Device Type 1 and Device Type 2 have in common and only present those options. For example, computing device may compare the ranges and determine that Device Type 1 and Device Type 2 have between 4-10 maximum failed attempts in common. In other words, of the device types which support the concept of maximum failed attempts, these device types all allow for the option of between 4-10 maximum failed attempts.

At step 408, the computing device can present, for example, through common settings interface 300, the settings which are common to two or more selected device types. The input method may provide the user with or limit the user to the available options for each common setting depending on the underlying device types sharing this common setting. For example, for the feature of password expiration where the password expires after the selected amount of days, the interface 300 may present an open-ended input field for the user to enter a value indicating the number of days after which the password is to expire.

Device Type 1 may only allow a value between 1-730 while the other device types may have no limits. Thus, the limits of Device Type 1 control for this feature, and interface 300 provides the user with this information 312. Another mechanism for limiting a user's choices to only the available options is in the form of a dropdown menu where the available choices in the dropdown menu are limited to the available options common to all included device types. Based on the determined available choices from step 406, the computing device can prepopulate the dropdown menu with the available options. Certain values for each common setting may be identified as the default, and the computing device may present the default option and allow the user to change from the default option. Some device types may have different default values. If the selected device types have the same default value for a common setting, the default value may be prepopulated. If the selected device types have different default values for a common setting, a default value might not be prepopulated.

At step 410, the computing device can receive the selections entered by the user for each common setting/concept via interface 300. At step 412, the computing device may apply the options or values entered by the user for the individual setting of each device type associated with a particular common setting/concept, for example, in response to the selection of APPLY COMMON SETTINGS button 316. The computing device may store the entered value as the input for the device type setting. After completion of the configuration process, the device or system may distribute or transmit these settings to the devices of each device type.

The user may change the selected device types for configuration at any time by, for example, returning to the interface 200 and changing the device type selections. In response to a change in the selected device types, all or some of the steps of the method illustrated in FIG. 4 may be repeated to dynamically update the common settings and options to reflect the current device type selections which provides the user with flexibility in the configuration process. The method of FIG. 4 may also be repeated for other common setting concepts.

Figure 5:
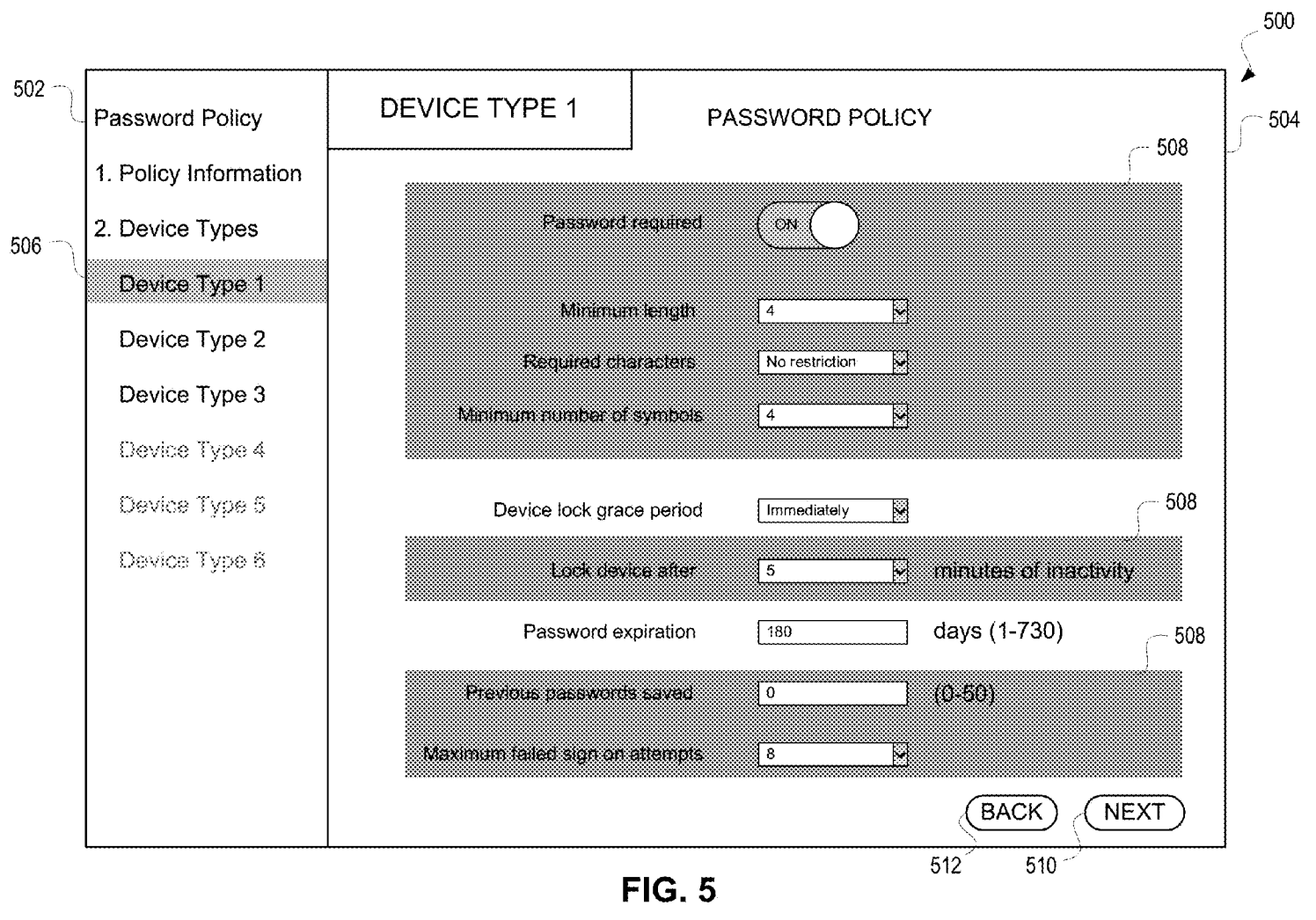

FIG. 5 depicts an illustrative Device Type 1 interface 500 with settings from the common settings interface 300 applied. Similar to FIG. 2, the interface 500 may have a navigation menu 502 which includes an indicator 506 that provides the user with information relating to progress in the overall policy configuration process. While the indicator 506 is shown as a highlighting of the text in FIG. 5, the indicator 506 may be presented in other forms such as a character, symbol, arrow, font style (e.g., bold, italics, underlining), etc. For the individual settings in Device Type 1 which have common settings applied, a common settings indicator 508 is shown for these features. The common settings indicator 508 may provide the user with information relating to whether a common setting value is applied. In the example shown in FIG. 5, some of the settings from the common settings interface 300 are also settings for Device Type 1 including "password required," "minimum length," "required characters," "minimum number of symbols," "lock device after," "password expiration," "previous passwords saved," and "maximum failed sign on attempts." In comparing the applied common settings in FIG. 3 with the settings in FIG. 5, the entered values or selected options for the common settings of Device Type 1 may be the same as those in FIG. 3 with the exception of "password expiration." Because the value for password expiration is different from the applied or stored common setting value of "90" (as shown in FIG. 3), the common settings indicator 508 for "password expiration" is not shown. The absence of the common settings indicator 508 signals to the user that the entered value is different than the common settings value. If the user changes the value back to "90," the common settings indicator 508 may be displayed for "password expiration." Because Device Type 1 is the only selected device type that supports the device lock grace period setting/concept, "Device lock grace period" is also not provided with a common settings indicator 508. Once the user is finished with the settings for the current device type, the user can select the NEXT button 510 to proceed to the settings configuration interface for the next device type. The user can select the BACK button 512 to return to a settings interface for a previous device type or to the common settings interface.

FIG. 6 shows an illustrative method for configuring settings of a device type. At step 600, the computing device may generate an interface and present the settings of a device type associated with a particular policy for configuration by the user via the interface, such as, interface 500. For example, the computing device may refer to a memory or other storage area (e.g., data server 103) for data or information of the individual settings of a device type for a particular policy.

At step 602, the computing device may prepopulate the fields of common settings in the device type to be the same as those applied from the common settings interface. When the values from the common settings interface are applied, the values may be stored for each individual setting associated with the specific common settings. For example, using the example of FIG. 3, password expiration after 90 days may be stored as the value for the password expiration setting of Device Type 1. In generating the settings and fields to present in interface 500, the computing device may retrieve the stored value of 90 and prepopulate the entry field corresponding to password expiration with "90."

At step 604, for those settings which have a common settings value applied, a common settings indicator is presented. For example, for those common settings values which are the same as the corresponding value provided via the common settings interface, a common settings indicator 508 may be shown. At step 606, the computing device may receive user input for a particular setting. For example, the user may change the entered or prepopulated value of a setting or enter a new value.

At step 608, the computing device may evaluate the entered or selected settings value to determine whether the common settings applied indicator should be displayed for the setting. Step 608 may include steps 610, 612, and 614. At step 610, the computing device may determine whether the received setting changes the value from the common settings value. For example, using the examples from FIGS. 3 and 5, the applied common setting value for password expiration may be 90 days as illustrated in FIG. 3 while in FIG. 5 the value for password expiration for Device Type 1 has been changed to 180. The computing device may compare the entered value of 180 days with the stored common settings value of 90 days and determine that the values are different.

If the computing device determines that the values are different, the device may proceed to step 612. In step 612, if a common settings applied indicator is shown for a setting for which the entered value does not match the applied common settings value, the common settings applied indicator may be removed if the indicator is being displayed. For example, in response to receiving an entry of 180 days via interface 500, the interface might not show the common settings indicator 508 for password expiration. If the computing device determines that the values are the same, the device may proceed to step 614 and present the common settings applied indicator if the indicator is not already presented. For example, in response to receiving an entry of 90 days via interface 500, the interface may show the common settings indicator 508 for password expiration. Step 608 may be repeated for each entered settings value.

At step 616, the computing device may apply the entered values for the settings in response to an input from the user such as a selection of NEXT button 510. The computing device may apply the entered values by storing the entered values in association with the corresponding settings for the device type in a database.

FIG. 7 illustrates another aspect of applying the same settings to more than one device type via an interface. FIG. 7 shows another common settings interface 700 where a user can provide settings for a particular device type and copy common or shared settings entered for the device type to other device types. The interface 700 may include a navigation menu 702 and a device type configuration area 704. Similar to other interfaces described herein, a progress indicator 718 may be shown and used in the navigation menu 702 to show the user the current stage of the process. Also similar to previously described interfaces, the text of the selected device types may be differentiated from unselected device types. For example, the text of the selected device types may be bolded, and the text of the unselected device types may be grayed out or unbolded as shown in FIG. 7. Selection of a device type may be indicated with a selected or unselected checkbox 720. Interface 200 may be used to select the device types for configuration.

The user can enter or select values for individual device type settings. After entering or selecting values for individual device type settings, the user can select the PREVIEW COMMON SETTINGS button 712 to have the interface show which individual settings supported by the particular device type are common to other selected device types. A preview settings indicator 716 may be used to show which individual settings are common settings. Alternatively, those fields that refer to concepts common to the selected device types might be automatically shaded or otherwise highlighted or marked in some fashion to indicate they are common among the selected device types.

By selecting the button 714, the user instructs the device to send a command to copy or apply the currently entered settings values for the common concepts to the other selected device types. For example, the computing device may store in its memory or in data server 103 the currently entered values as the value for each common setting. The computing device may determine which individual device type is associated with each common setting and copy the common settings value to be the value of the associated individual device type value.

After copying the common settings to selected device types, a copied common settings indicator may be used to indicate the currently displayed or entered values for a common setting is the same for the selected device types. For example, a first level of shading, highlighting, or coloration may be used to indicate settings which could be applied (but are not yet applied) to all the selected device types because the selected device types all share those concepts. A second level of shading, highlighting, or coloration may be used to indicate settings which are currently common among the selected device types. In the example shown in FIG. 7, Device Type 1 is the only device type among the selected device types which supports the feature of a "device lock grace period," so FIG. 7 does not show a preview settings indicator 716 for the "device lock grace period" setting.

Figure 8:
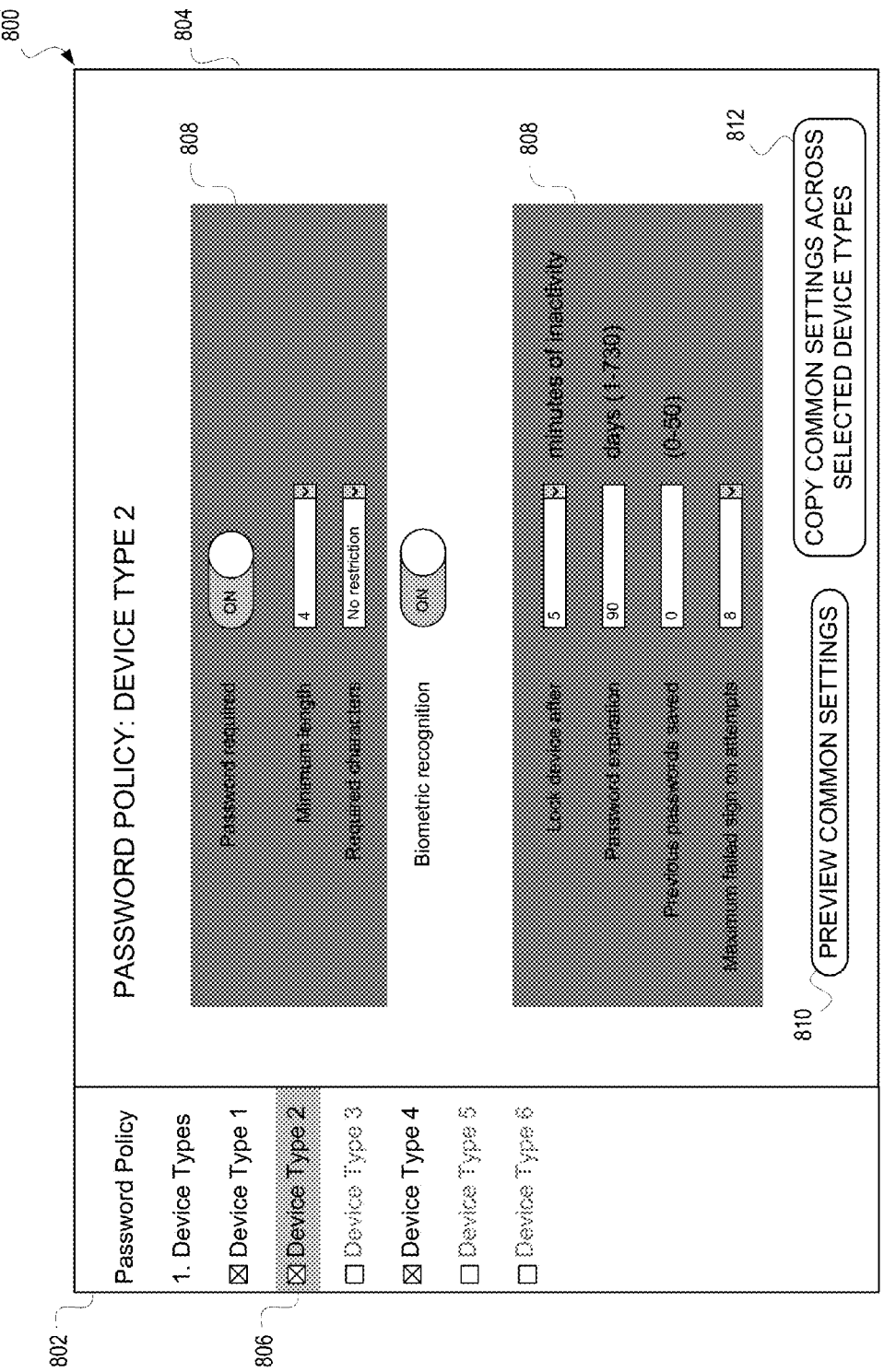
FIG. 8 depicts another illustrative common settings and device type settings configuration interface in accordance with one or more illustrative aspects described herein.

FIG. 8 illustrates a settings configuration interface 800 for Device Type 2. The setting configuration interface 800 for Device Type 2 is similar to the interface 700 for Device Type 1. Configuration interface 800 may include the navigation menu 802 listing the configuration stages and indicating with an indicator 806 the current configuration stage. The configuration area 804 may include individual settings of Device Type 2 for the password policy and corresponding entry fields. If Device Type 2 includes common settings and common settings values were previously copied across the selected device types, the entry fields may be prepopulated with the copied common settings values and a copied common settings indicator 808 may be shown to indicate which settings have values equal to the copied common settings values. Similar to interface 800, the user can select the PREVIEW COMMON SETTINGS button 810 to preview which settings of Device Type 2 are common to more than one device type. In response to the selection of button 810, the interface 800 can show the preview settings indicator 716 as shown with respect to FIG. 7. Similar to FIG. 7, if the user changes a settings value so that it is different from the copied common settings value, the indicator 716 or 808 may not be shown for the changed setting. Selecting button 812 may copy the entered or selected values for the common settings to all of the device types which have common settings. The indicators 716, 808 may be in the form of highlighting of text and corresponding fields of each setting. Indicator 716 may be differentiated from indicator 808, for example, by color or a pattern.

Figure 9:
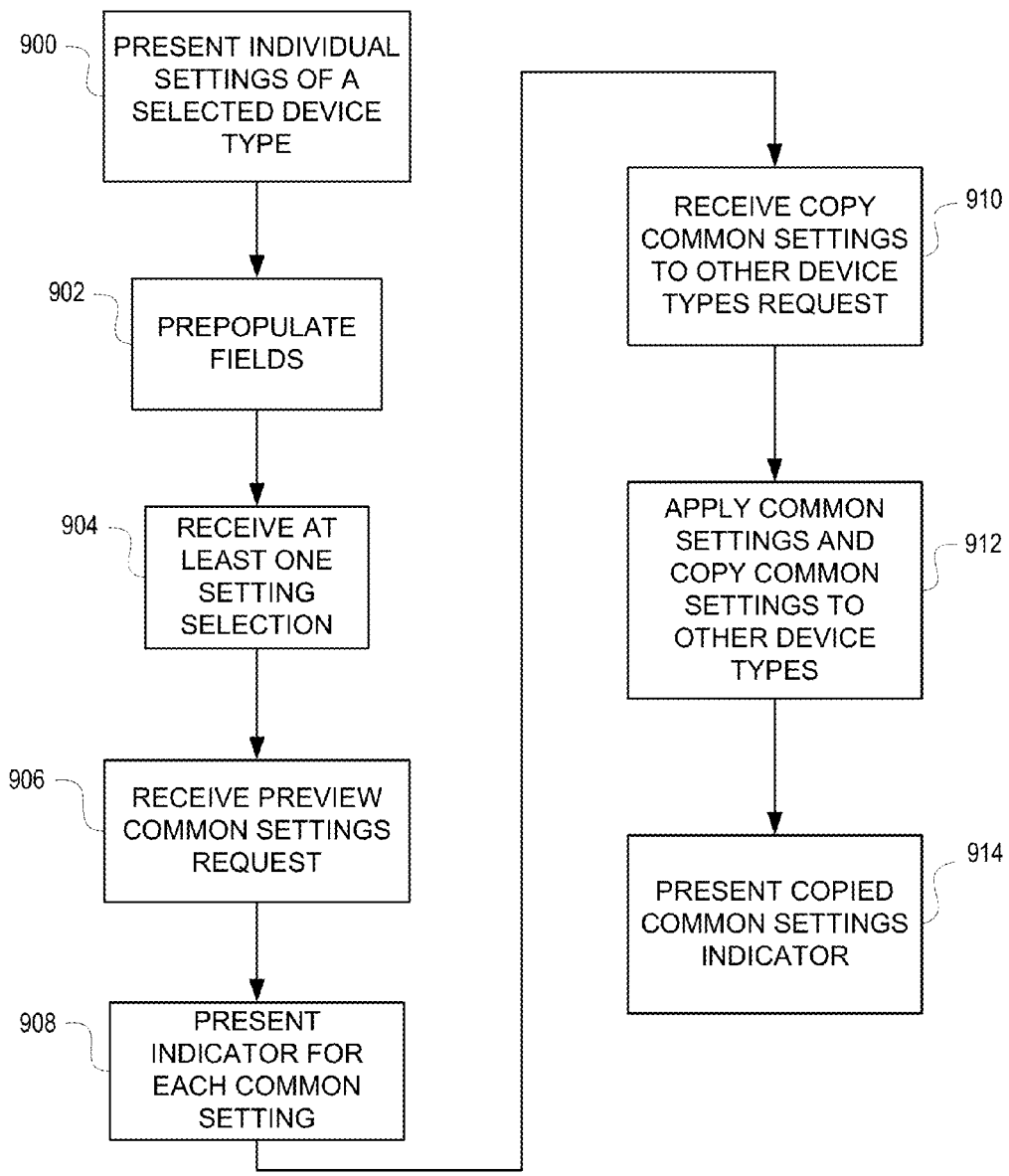
FIG. 9 depicts a flowchart of an illustrative method of configuring common settings and device type settings in accordance with one or more illustrative aspects described herein.

FIG. 9 shows an illustrative method for configuring common settings and individual settings for selected device types according to some aspects. At step 900, settings for a particular device type may be determined and presented, for example, via interface 700 or 800. The computing device may refer to a database or other storage device containing information about device settings of a device type associated with the policy being configured.

At step 902, the fields for each setting may be prepopulated with a default value or a copied common settings value. The computing device may reference values stored for common settings and prepopulate the fields with the stored values. When generating the interface 800, the computing device may retrieve the values stored for individual settings as a result of copying common settings and prepopulate the corresponding input fields with these values. For example, if the value of "4" for the minimum length is stored as a common setting to other device types using the interface 700, the value "4" is stored for the setting minimum length of Device Type 2 which corresponds to the minimum length setting of Device Type 1. When generating the interface 800 for configuring Device Type 2, the dropdown menu for minimum length may be preset at "4."

At step 904, a user may enter a value into a field or a select a value from a dropdown menu for the field of different settings of the current device type. At step 906, the computing device may receive a user input request or a command to preview common settings, for example, through the selection of the PREVIEW COMMON SETTINGS button 712, 810. The device may determine which settings of the current device type are settings also present in other selected device types. The computing device may present a preview settings indicator, for example, indicator 716 for each common setting at step 908. At step 910, the computing device may receive a request to copy common settings to all selected device types. The request may be, for example, provided through the user selection of the button 714, 812. At step 912, the computing device may copy the entered common settings values to be the same for corresponding common settings of other device types and save or apply the entered values for the current device type. At step 914, the copied common settings indicator may be shown for common settings whose values have been copied to other device types or are the same as the common settings values for other device types.

In another aspect, a dedicated common settings interface may be provided to the user which may be accessed at any stage of the configuration process. For example, a link to a dedicated common settings interface may be provided on each device type configuration interface. As another example, a common settings stage may be added to the navigation menu, and the user may select the common settings stage to go to the common settings interface. The dedicated common settings interface may be similar to FIG. 3.

While the examples described herein refer to a password policy, other policies may also be configured using aspects described herein. Other policies may include a virtual private network (VPN) policy, wi-fi policy, network connection policy, hardware control policies, application control policies, location services policy, and information synchronization policies (e.g., synchronization of e-mail, calendar items, and task items with a remote server).

Examples of VPN policy settings may include connection name, server name or IP address, backup VPN server, connection type, username, password, user group name, authentication type, pre-shared key, and certificate security information.

Examples of wi-fi policy settings may include network type, network name (e.g., service set identification (SSID)), encryption type, password, automatic joining of the wireless network, hidden network name, proxy server port, username, and password.

The above settings are just nonlimiting examples. The techniques described herein may be used to conveniently adjust any setting that corresponds to a concept shared by at least two device types.

FIG. 10 depicts example mappings and valid options of settings of each device type relating to a password policy. The data on mappings and valid options may be stored in a data storage device, for example, data server 103. Column 1001a provides a list of example settings/concepts supported by any of the device types. The information in each subsequent column 1001b-1001d may indicate whether each device type supports a particular setting, whether the setting is a required setting, and what the valid values or selections are for each setting. If a setting/concept in column 1001a is supported by more than one device, then the setting/concept may be identified as a common setting/concept. The system may analyze the device type information in the corresponding row to determine valid common values or entries for the common setting/concept. The setting information for each device type may include the name of the setting according to the particular device type, and the system can map the corresponding device type specific name to a common setting/concept. For example, the common setting/concept of a minimum length for a password may be identified as "Minimum length codes" on Device Type 1 and as "Minimum password length" on Device Type 2. The common/setting concept may identify these different names as correlating or mapping to the common setting/concept of "minimum length." If Device Type 1 and Device Type 2 are selected for configuration, a computing device may obtain from the stored data information indicating the that Device Type 1 supports 1-14 characters for the minimum password length and Device Type 2 supports 4-16 characters for the minimum password length.

While illustrative method steps have been described as being performed by a computing device, it is to be understood that the steps may be performed in a different order than described and may be performed by more than one computing device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a computing device, an indication of selected device types;
determining, by the computing device, at least one common setting of the selected device types based on individual settings of each selected device type;
determining, by the computing device, common options for a first common setting of the at least one common setting;
presenting, on a configuration screen, a plurality of individual settings of a first configuration policy for a first selected device type;
determining, by the computing device, that a user selection for a first individual setting of the plurality of individual settings is associated with a common option of the first common setting;
receiving a request to copy a common setting across the selected device types; and
responsive to receiving the request to copy a common setting, storing the user selection for the first individual setting as user selections for individual settings of other device types associated with the first common setting.

2. The method of claim 1, further comprising:
presenting a configuration screen, for a second selected device type, including an individual setting of the second selected device type associated with the first common setting; and
populating an input field of the individual setting of the second selected device type with the stored user selection prior to receiving any user input in the input field.

3. The method of claim 2, further comprising:
presenting, on the configuration screen for the second selected device type, a common settings indicator for the individual setting of the second selected device type in response to the input field being populated with the stored user selection.

4. The method of claim 1, further comprising:
receiving, while displaying the configuration screen, a request to preview common settings of the first configuration policy; and
responsive to receiving the request, presenting, on the configuration screen, a common settings indicator identifying at least one individual setting of the plurality of individual settings as a setting common to at least one other device type.

5. The method of claim 1, further comprising:
receiving a user selection for a second individual setting of the plurality of individual settings; and determining, based on a value selected by the user selection for the second individual setting, whether to present or remove a common settings applied indicator for the second individual setting.

6. The method of claim 1, further comprising:
responsive to storing the user selection, presenting, on the configuration screen, a copied common settings indicator for the first individual setting.

7. The method of claim 1, wherein the common options for the first common setting comprise a range of allowed values, and the method further comprises:
presenting, on a common settings interface, an input field of the first common setting with information indicating the allowed range of values for the first common setting.

8. The method of claim 1, further comprising:
determining a level of an indicator based on whether a common setting is currently common among the selected device types; and
presenting, based on the determined level, a first level indicator that indicates one or more common settings which are not currently common among the selected device types or a second level indicator that indicates one or more common settings which are currently common among the selected device types.

9. One or more non-transitory computer-readable media storing instructions that, when executed by one or more computing devices, cause the one or more computing devices to:
receive an indication of selected device types;
determine at least one common setting of the selected device types based on individual settings of each selected device type;
determine common options for a first common setting of the at least one common setting;
present, on a configuration screen, a plurality of individual settings of a first configuration policy for a first selected device type;
determine that a user selection for a first individual setting of the plurality of individual settings is associated with a common option of the first common setting;
receive a request to copy a common setting across the selected device types; and
responsive to receiving the request to copy a common setting, store the user selection for the first individual setting as user selections for individual settings of other device types associated with the first common setting.

10. The one or more non-transitory computer-readable media of claim 9, storing further instructions that, when executed by the one or more computing devices, cause the one or more computing devices to:
present a configuration screen, for a second selected device type, including an individual setting of the second selected device type associated with the first common setting; and
populating an input field of the individual setting of the second selected device type with the stored user selection prior to receiving any user input in the input field.

11. The one or more non-transitory computer-readable media of claim 10, storing further instructions that, when executed by the one or more computing devices, cause the one or more computing devices to:
present, on the configuration screen for the second selected device type, a common settings indicator for the individual setting of the second selected device type in response to the input field being populated with the stored user selection.

12. The one or more non-transitory computer-readable media of claim 9, storing further instructions that, when executed by the one or more computing devices, cause the one or more computing devices to:
receive, while displaying the configuration screen, a request to preview common settings of the first configuration policy; and
responsive to receiving the request, present, on the configuration screen, a common settings indicator identifying at least one individual setting of the plurality of individual settings as a setting common to at least one other device type.

13. The one or more non-transitory computer-readable media of claim 9, storing further instructions that, when executed by the one or more computing devices, cause the one or more computing devices to:
responsive to storing the user selection, present, on the configuration screen, a copied common settings indicator for the first individual setting.

14. The one or more non-transitory computer-readable media of claim 9, wherein the common options for the first common setting comprise a range of allowed values, and wherein the one or more non-transitory computer-readable media stores further instructions that, when executed by the one or more computing devices, cause the one or more computing devices to:
present, on a common settings interface, an input field of the first common setting with information indicating the allowed range of values for the first common setting.

15. An apparatus, comprising:
at least one processor, and
memory storing instructions that, when executed by the at least one processor, cause the apparatus to:
receive an indication of selected device types;
determine at least one common setting of the selected device types based on individual settings of each selected device type;
determine common options for a first common setting of the at least one common setting;
present, on a configuration screen, a plurality of individual settings of a first configuration policy for a first selected device type;
determine that a user selection for a first individual setting of the plurality of individual settings is associated with a common option of the first common setting;
receive a request to copy a common setting across the selected device types; and
responsive to receiving the request to copy a common setting, store the user selection for the first individual setting as user selections for individual settings of other device types associated with the first common setting.

16. The apparatus of claim 15, wherein the memory further stores instructions that, when executed by the at least one processor, cause the apparatus to:
present a configuration screen, for a second selected device type, including an individual setting of the second selected device type associated with the first common setting; and
populating an input field of the individual setting of the second selected device type with the stored user selection prior to receiving any user input in the input field.

17. The apparatus of claim 16, wherein the memory further stores instructions that, when executed by the at least one processor, cause the apparatus to:

present, on the configuration screen for the second selected device type, a common settings indicator for the individual setting of the second selected device type in response to the input field being populated with the stored user selection.

18. The apparatus of claim 15, wherein the memory further stores instructions that, when executed by the at least one processor, cause the apparatus to:
receive, while displaying the configuration screen, a request to preview common settings of the first configuration policy; and
responsive to receiving the request, present, on the configuration screen, a common settings indicator identifying at least one individual setting of the plurality of individual settings as a setting common to at least one other device type.

19. The apparatus of claim 15, wherein the memory further stores instructions that, when executed by the at least one processor, cause the apparatus to:
responsive to storing the user selection, present, on the configuration screen, a copied common settings indicator for the first individual setting.

20. The apparatus of claim 15, wherein the common options for the first common setting comprise a range of allowed values, and wherein the memory further stores instructions that, when executed by the at least one processor, cause the apparatus to:
present, on a common settings interface, an input field of the first common setting with information indicating the allowed range of values for the first common setting.

* * * * *